Figure 1:
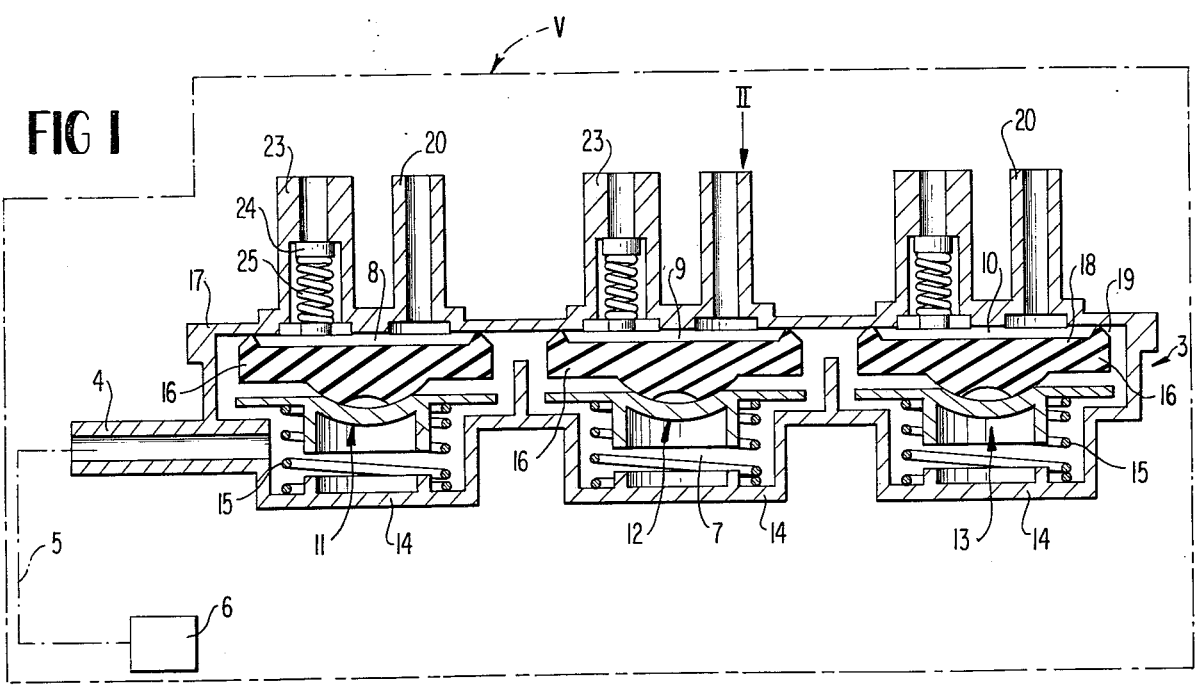

United States Patent [19]

Reinhard et al.

[11] 4,121,613
[45] Oct. 24, 1978

[54] VEHICLE ESPECIALLY MOTOR VEHICLE WITH OPERATIONALLY CONDITIONED VACUUM LOADS AND COMFORT VACUUM LOADS

[75] Inventors: Theodor Reinhard, Böblingen; Rüdiger Hoffmann; Ernst Haug, both of Sindelfingen, all of Germany

[73] Assignee: Daimler-Benz Aktiengesellschaft, Stuttgart, Germany

[21] Appl. No.: 787,442

[22] Filed: Apr. 14, 1977

[30] Foreign Application Priority Data

Apr. 17, 1976 [DE] Fed. Rep. of Germany ....... 2617132

[51] Int. Cl.² .................. F16K 17/04; B60K 25/04
[52] U.S. Cl. ............................ 137/351; 137/540; 137/606; 137/881
[58] Field of Search ............... 137/DIG. 8, 351, 353, 137/512, 540, 552, 557, 559, 606, 881

[56] References Cited

U.S. PATENT DOCUMENTS

| 3,086,544 | 4/1963 | Yost | 137/540 X |
| 3,470,893 | 10/1969 | Nelson | 137/351 X |

FOREIGN PATENT DOCUMENTS 2,114,589 10/1972 Fed. Rep. of Germany .... 137/DIG. 8

*Primary Examiner*—Gerald A. Michalsky
*Attorney, Agent, or Firm*—Craig & Antonelli

[57] ABSTRACT

A vehicle with operationally conditioned vacuum loads and comfort vacuum loads, in which a central distributor box is provided that is equipped with a feed connection to connect a distributor chamber with a vacuum source; at least two load chambers are also provided in the distributor box, whereby each load chamber is connected with the distributor chamber by way of a protective valve opening in the direction to the distributor chamber against a spring force, and with a load connection which is in communication with a test connection that opens into the atmosphere after overcoming a spring-loaded valve.

14 Claims, 2 Drawing Figures

U.S. Patent   Oct. 24, 1978   4,121,613

VEHICLE ESPECIALLY MOTOR VEHICLE WITH OPERATIONALLY CONDITIONED VACUUM LOADS AND COMFORT VACUUM LOADS

The present invention relates to a vehicle, especially to a motor vehicle, with operationally conditioned vacuum loads serving for the control of the driving engine and/or of the operating brake and the like and with comfort vacuum loads for the vehicle central locking system for a tank lid locking system, for the backrest locking system and the like.

In a prior art vehicle of this type (German Offenlegungsschrift No. 2,114,589), both types of vacuum loads are connected to a common vacuum source. For purposes of assuring the functioning of the operationally conditioned vacuum loads, supervisory or pilot valves which operate in dependence on the pressure are provided for the individual comfort vacuum loads in order to disconnect or turn-off the latter when the vacuum in the system fails or decreases for any reason.

In contradistinction thereto, the present invention is concerned with the task to keep as small as possible the line expenditures for the comfort vacuum loads and to facilitate the maintenance and testing service for this type of loads.

The underlying problems are solved according to the present invention by a central distributor box with a distributor chamber provided with a feed connection for the connection with a vacuum source independent of the operationally conditioned vacuum loads and with at least two load chambers, in which each load chamber is connected with the distributor chamber by way of a protective valve opening in the direction to the distributor chamber against a spring force, and in which each load chamber also includes at least one load connection for comfort vacuum loads which is in communication with a test connection opening to the atmosphere after selectively overcoming a spring-loaded closure valve.

In the vehicle according to the present invention, the comfort vacuum loads are independent as regards their pressure supply from the operationally conditioned vacuum loads so that special supervisory or monitoring valves with a vacuum control are not required. The distributor box can be arranged at any suitable place in the vehicle from which result short line paths to the loads. During the occurrence of a defect, the load or its associated line system causing the defect can be determined directly at the distributor box by means of the test connections existing thereat—without having to pull off any lines. The distributor chamber is necessarily vented by the defect whereby the other loads are necessarily closed off by the associated protection valves of the distributor box. This is important for such loads as, for example, the backrest locking mechanism which are held in their operating position by means of a vacuum.

In the vehicle according to the present invention, the distributor box may be so constructed that the test connection branches off from a load connection.

However, the distributor box may also be advantageously so constructed that the test connection starts from the load chamber. In this manner, parallelly extending connecting nipples for the test and load connection may be provided in this manner, as a result of which the line layout as also the box manufacture are facilitated.

Accordingly, it is an object of the present invention to provide a vehicle, especially a motor vehicle, with operationally conditioned vacuum loads and comfort vacuum loads, which avoids by simple means the aforementioned shortcomings and drawbacks encountered in the prior art.

Another object of the present invention resides in a vehicle with different types of vacuum loads in which pressure-dependent monitoring valves can be dispensed with.

A further object of the present invention resides in a vehicle, especially in a motor vehicle, with operationally conditioned vacuum loads and comfort loads, in which the line expenditures for the comfort vacuum loads can be kept relatively low while service and test operations for these types of loads can be greatly facilitated.

A still further object of the present invention resides in a vehicle of the type described above in which the comfort vacuum loads are independent as regards their pressure supply from the operationally conditioned vacuum loads.

Another object of the present invention resides in a distributor box for a vacuum system of a vehicle which is so constructed that the distributor box can be arranged at a suitable location of the vehicle, resulting in short lines to the respective loads.

A further object of the present invention resides in a vacuum system for motor vehicles which permits a direct detection of the part of the system in which a defect occurs.

Still another object of the present invention resides in a distributor box for a vacuum system of motor vehicles which is relatively simple in construction, involves simple parts and can be manufactured and installed at relatively low costs.

Figure 2:
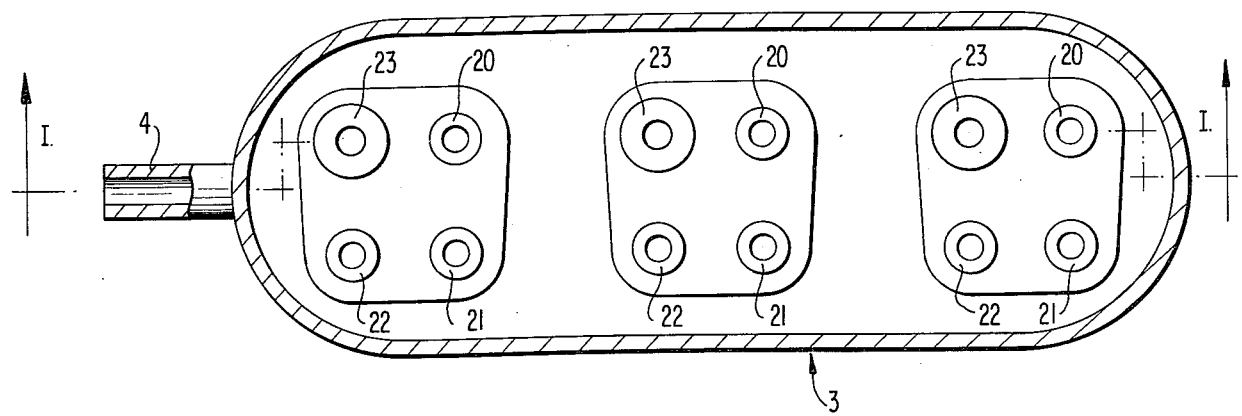

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through a vacuum distributor box of a vehicle according to the present invention, taken along line I—I in FIG. 2; and FIG. 2 is a plan view on a distributor box taken in the direction of arrow II in FIG. 1.

Referring now to the drawing wherein like reference numerals are used throughout the two views to designate like parts, the distributor box generally designated by reference numeral 3 includes a feed connection 4 which is connected by way of a feed line 5 with a vacuum pump 6 driven by the vehicle generally designated by the reference character V. In the interior of the distributor box 3, the feed connection 4 terminates in a distributor chamber 7 which is separated with respect to three load chambers 8, 9 and 10 by one protective valve each generally designated by reference numerals 11, 12 and 13.

Valve springs 15 are guided in bays 14 of the distributor box 3 and are supported with one end thereof in the bottom of these bays 14, while the springs 15 engage with their other end at a respective valve disk 16 of a corresponding protective valve 11, 12 and 13. The wall 17 of the distributor box 3 which is disposed opposite the bays 14, serves as valve seat for the valve disk or plate 16. The surface 18 of the valve disk 16 which faces the wall 17 is enclosed by a raised ring-shaped closure cone 19 which rests against the inner surface of the wall 17. Three load connections 20, 21 and 22 as well as a test connection 23 terminate each in a respective load chamber 8 or 9 or 10 within the area of the wall 17 enclosed by a respective closure cone 19.

The test connections 23 include a closure valve or check valve 24 effectively interconnected between the atmosphere and the respective load chamber 8 or 9 or 10, which is held closed by a spring 25 operating against the vacuum.

If the vacuum pump 6 operates and all load connections 20, 21 and 22 of the three load chambers 8, 9 and 10 are connected with their associated loads, the protective valves 11, 12 and 13 are opened whereas the test connections 23 are closed off with respect to the atmosphere by the closure valves 24. As a result thereof, all four chambers 7 to 10 are connected with the pump 6.

If a defect occurs in one of the vacuum circuits connected by way of the respective load connections 20, 21 and 22 with one of the load chambers 8, 9 and 10, for example, with the load chamber 8, then the distributor chamber 7 is vented by way of the corresponding load chamber 8, as a result of which the two other load chambers 9 and 10 are closed off with respect to the distributor chamber 7 by way of their respective protective valves 12 and 13.

If this position of the protective valves 11 to 13 is recognizable as such—for example, by a transparency of the distributor box or by way of special signal indicators or transmitters—then an indication for the defective place or for the defective vacuum circuit already exists in that case.

Otherwise, the defective vacuum circuit can be determined by means of a test apparatus, for example, in the manner of a tire manometer, by way of the test connections 23.

The distributor box 3 can be constructed for as many vacuum circuits as installations exist in the vehicle.

The distributor box can be mounted under the instrument panel preferably accessible from the vehicle interior space.

Each vacuum circuit can be clearly marked externally so that in case of a diagnosis, no doubts can occur in which area the defects or damages occur.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A vehicle with operationally conditioned vacuum loads and comfort vacuum loads, characterized in that the vehicle includes a central distributor box means including a distributor chamber means and with at least two load chamber means, the distributor chamber means being adapted to be connected by way of a feed connection of the distributor box means with a vacuum source independent of the operationally conditioned vacuum loads, each load chamber means being operatively connected with the distributor chamber means by way of a protective valve means opening in a direction toward the distributor chamber means against a spring force, and each load chamber means including at least one load connection means in communication with a test connection means.

2. A vehicle according to claim 1, characterized in that the test connection means is operable to open in a direction toward the atmosphere after selectively overcoming a spring-loaded closure valve.

3. A vehicle according to claim 2, characterized in that the test connection means branches off from the load chamber means.

4. A vehicle according to claim 1, characterized in that the test connection means branches off from the load chamber means.

5. A central distributor box for a vacuum system of vehicles with operationally conditioned vacuum loads and comfort vacuum loads, the central distributor box comprising:

a distributor chamber means, a feed connection means for connecting the distributor chamber means with a vacuum source, at least two load chamber means provided in the distribution chamber means, a spring-loaded protective valve means provided in each of the load chamber means for controlling a communication between each of the load chamber means and the distributor chamber means, each of said protective valve means opening in a direction toward the distributor chamber means against a spring force, at least one load connection means provided at each load chamber means for permitting a connection of a load to the distributor box, and a test connection means provided at each of the load chamber means in communication with the load connection means for permitting a testing of a load associated with the load chamber means to determine if a defect has occurred in the load or a system associated with the load.

6. A distributor box according to claim 5, characterized in that the test connection means starts from the load chamber means.

7. A distributor box according to claim 6, characterized in that each test connection means includes a spring-loaded check valve means, and in that each check valve means opens toward the atmosphere after selectively overcoming a spring force of the check valve means.

8. A distributor box with a housing according to claim 5, characterized in that each protective valve means include a raised, endless closure portion engaging with a wall of the distributor box and defining a load chamber means by a space enclosed therewithin.

9. A distributor box according to claim 8, characterized in that the raised portion is an annularly-shaped closure cone provided on the protective valve means on a side thereof facing a wall of the distributor box containing the load connection means and the test connection means.

10. A distributor box according to claim 9, characterized in that the distributor box includes a number of bay areas corresponding to the number of load chamber means, each protective valve means includes a spring guided in each bay area, each spring is supported at a first end thereof against a bottom of the bay and at a second end thereof against a spring plate means for supporting thereon the protective valve means.

11. A distributor box according to claim 10, characterized in that the housing is elongated and in that several load connection means are provided for each load chamber means.

12. A distributor box according to claim 10, characterized in that the test connection means starts from the load chamber means.

13. A distributor box according to claim 10, characterized in that each test connection means includes a spring-loaded check valve means, and in that each check valve means opens toward the atmosphere after selectively overcoming a spring force of the check valve means.

14. A distributor box according to claim 5, characterized in that the housing is elongated and in that several load connection means are provided for each load chamber means.

* * * * *